United States Patent Office 2,813,835
Patented Nov. 19, 1957

2,813,835

REACTIVATION OF SULFIDE CATALYSTS

Kenzie Nozaki, El Cerrito, Calif., assignor to Shell Development Company, New York, N. Y., a corporation of Delaware No Drawing. Application January 19, 1956,
Serial No. 560,059

8 Claims. (Cl. 252—411)

This invention relates to the reactivation of metal sulfide catalysts comprising as the active constituent one or more metals of the iron group in combination with one or more metals of the left hand column of group VI of the periodic system, which catalysts have been deactivated through use in the treatment of a carbonaceous reactant at an elevated temperature of at least 300° C.

The object of the invention is to provide a process whereby sulfide catalysts of the type mentioned may be reactivated to a higher activity after having been deactivated through use at high temperatures in the treatment of a carbonaceous material, e. g., a mineral oil.

Catalysts of the type in question are well known and have found wide application in various treatments of carbonaceous reactants at high temperatures. They are generally, but not always, used in the presence of hydrogen which, among other things, tends to prolong the life of the catalyst. They are frequently used in processes involving the dehydrogenation of hydrocarbons in which case they are generally employed at temperatures of about 425° C. up to about 590° C. They are also used under hydrogenation conditions for the treatment of hydrocarbon oils in which case somewhat lower temperatures, e. g., about 300 to 450° C. are generally employed. In all of these cases where temperatures above about 300° C. are employed, the catalysts gradually decline in activity with use. This deactivation is in part caused by the deposition on the catalyst surface of carbonaceous deposits often referred to as tar or coke. However, this cause of the deactivation is not necessarily the main cause. Thus, as shown in U. S. Patent No. 2,426,483 to Boucher such catalysts after a period of use may be reactivated by treating them with air at quite low temperatures where neither the carbonaceous deposits nor the sulfur in the catalyst is removed. The catalyst may be also reactivated at somewhat higher controlled temperatures where the carbonaceous deposits are removed without removing the sulfur in the catalyst. Such reactivation is disclosed in U. S. Patent No. 2,671,763 to Winstrom. These reactivations, while possible, do not, as a rule, restore the catalytic activity completely and they become less effective upon each succeeding reactivation treatment. It is therefore necessary to at least periodically reactivate the catalyst by a more drastic regeneration treatment in which case the carbonaceous deposits as well as the sulfur are removed by a controlled burning treatment, after which the catalyst is resulfided and then usually reduced. This treatment can be done after removing the catalyst from the reactor but it is preferably effected with the catalyst in situ. Thus, at the end of the process period in which the carbonaceous reactant is being treated at a temperature above 300° C., e. g., 450° C., the reactant feed is stopped and the catalyst mass in the reactor is flushed of hydrocarbons with an inert gas, e. g., flue gas or steam. Preheated air, usually diluted strongly with inert gas or steam, is then passed through the catalyst to burn off the carbonaceous deposits and sulfur. The temperature is normally held between about 400 and 550° C. The oxygen concentration and the gas rate are controlled so that the temperature does not rise sufficiently to damage the catalyst, the maximum temperature usually being held below 650° C. Upon completion of the burning treatment the hot catalyst is flushed of free oxygen and is then sulfided. The sulfiding step is also exothermic and the rate and concentration of the sulfiding agent (usually $H_2S$) are again controlled so that the maximum temperature does not exceed about 650° C. Following the sulfiding treatment it is customary to start recycling hydrogen through the catalyst while cooling it back to the desired processing temperature. This reduces the catalyst to its normal state. When the processing temperature is reached the feed is cut in and a new process period is thus started. A preferred modification of the above disclosed reactivation treatment is described in further detail in U. S. Patent No. 2,398,175 to Cole.

The process of this invention stems from the unexpected discovery that in the case of the particular catalysts in question reactivation to a considerably higher activity is obtained if the catalyst in the oxidized state resulting from the oxidative burning of the carbonaceous deposits is cooled to a temperature downward of about 250° C., while avoiding reducing conditions, and then treated for upward of about one-half hour at a temperature between about 100° C. and about 250° C. with a mixture of hydrogen and hydrogen sulfide in a mol ratio of from about 2:1 to about 50:1 prior to heating the catalyst back to the processing temperature.

The reactivation method of the invention holds no advantage for the reactivation of the general run of metal sulfide catalysts. For many metal sulfide catalysts it offers no appreciable enhancement of activity but on the contrary, would be disadvantageous in that it involves a time-consuming cooling step which would under normal circumstances be avoided. It is found however to afford a much enhanced activity in the reactivation of catalysts comprising one or more iron group metal sulfides in combination with sulfides of one or more metals of the left hand column of group VI of the periodic system. The reactivation method is advantageous with catalysts in which the iron group metal sulfide is cobalt sulfide, and particularly advantageous when the iron group metal sulfide is nickel sulfide. In the combination catalyst mentioned it is more advantageous the higher the content of the iron group metal sulfide in the mixture. These catalytic promoters may be used alone or with suitable catalyst carriers. The catalyst may contain minor amounts of other conventional promoters and/or stabilizing materials. Particular examples of catalysts which may be advantageously reactivated according to the present method are those consisting essentially of an adsorptive alumina carrier impregnated with the sulfides of the following metals: Ni+Mo, Ni+W, Ni+Mo+W, Ni+Cr+W, Co+Mo, Ni+Co+W.

A particular example of the reactivation according to the invention follows:

The catalyst in this particular and non-limiting example consists essentially of an activated alumina carrier impregnated with 3.1% Ni, 3.5% W, and 6.4% Mo, these metals being present in the form of their sulfides. The catalyst in the form of $3/16$-inch pellets is supported as a fixed foraminous bed weighing about 50 tons in a suitable hydrogenation reactor. It is used to treat a hydrocarbon oil at a processing temperature of 450° C. under 750 p. s. i. g. pressure of hydrogen. After a period of use during which the catalyst activity has fallen to an uneconomical level the reactor is depressured and purged with flue gas to remove hydrocarbon vapors and hydrogen. Air diluted with flue gas is then passed through the catalyst bed in the reactor until the carbonaceous deposits are substantially completely burned and the metal sulfides in the catalyst are converted to the corresponding oxides. This burning is controlled by the air rate so that the catalyst is not damaged by overheating. Thus, the burning is carried out at a temperature between about 400° C. and 590° C., care being taken that the temperature does not at any time exceed 650° C.

When the carbonaceous materials have been removed, cold air is passed through the reactor until the temperature of the catalyst has dropped to about 180° C. The reactor is then flushed with flue gas and then a mixture of hydrogen and hydrogen sulfide in a mol ratio of about 12:1 is passed through the catalyst for about 4 hours while maintaining the temperature at about 200° C. The reactor is then reheated to the processing temperature of 450° C. while still passing the mixture of hydrogen sulfide and hydrogen or hydrogen alone. When the temperature reaches the processing temperature the hydrogen sulfide, if still being used, is cut out from the mixture, the hydrogen flow is continued, and the feed is introduced into the reactor thus starting the next process period.

In the process of the invention it is essential that the catalyst, following the oxidation treatment, be cooled to a temperature below about 250° C. before introducing the mixture of hydrogen and hydrogen sulfide. It is also essential that the catalyst be protected from reducing conditions between the time that the air used in the oxidation treatment is cut out and the time the mixture of hydrogen and hydrogen sulfide is applied. Thus, the catalyst may be cooled from the oxidation temperature down to the desired temperature below 250° C. by passing cool air, flue gas, steam, or any other non-reducing gas through the catalyst bed, but not such materials as hydrogen, hydrocarbons, or other reducing gases. It is also essential that the mixture of hydrogen and hydrogen sulfide used as described above consist essentially of these gases in the stated ratios. These gases used either alone or separately in sequence do not afford the enhanced activity. This is also true of mixtures of hydrogen sulfide with other gases such, for instance, as nitrogen in place of hydrogen.

*Examples*

In a series of comparable runs the catalyst used consisted of an activated alumina containing 2.9% Ni and 13.6% Mo in the form of their sulfides. The catalyst was used in a fixed bed for the hydrogenation of crude alpha-methyl naphthalene containing 0.95% sulfur and 0.2% nitrogen. The hydrogenation was effected at a temperature of 375° C. under a pressure of 500 p. s. i. g. and a liquid hourly space velocity of 10, the mol ratio of hydrogen to hydrocarbon in the feed being 8.4:1.

After a period of use the carbonaceous materials were removed and the catalyst oxidized by passing air through the catalyst for about 16 hours at atmospheric pressure while maintaining the temperature at about 400° C.

The reactivations were completed in different ways as follows:

A. Following the oxidation, the catalyst was cooled to 200° C. in a current of air. It was then flushed and treated for one hour at 200° C. with a mixture of 12 mols of hydrogen to 1 mol of hydrogen sulfide. Following this the catalyst was reheated to the processing temperature to 375° C. and pressurized. When the temperature reached 375° C., the flow of hydrogen sulfide was stopped and the feed was introduced.

B. After the described oxidation, the catalyst was cooled to 200° C. in air as in case A. It was then flushed and treated for one hour at 200° C. with hydrogen sulfide. While continuing the flow of hydrogen sulfide the catalyst was then heated to the operating temperature of 375° C. When the temperature of the catalyst reached 375° C. the flow of hydrogen sulfide was discontinued and the flow of hydrogen and hydrocarbon feed was started.

C. After the described oxidation, the catalyst was cooled in air only to the processing temperature of 375° C. It was then flushed and treated for one hour at 375° C. with hydrogen sulfide. The flow of hydrogen sulfide was then discontinued and hydrogen and feed were introduced.

D. After the described oxidation, the catalyst was cooled in air only to the processing temperature of 375° C. It was then flushed and treated for one hour at 375° C. with hydrogen. The hydrocarbon feed was then introduced starting a new process period.

E. The catalyst D after reuse and reoxidation as described above was treated as in A.

F. A catalyst treated as in C above had a relative activity of 0.27. The catalyst was reactivated according to the method of the invention (as in A above).

The conversions of the crude alpha-methyl naphthalene to methyl tetralin obtained following reactivation in the above manners, as well as the relative activities of the various reactivated catalysts, on a liquid hourly space velocity basis are shown in the following table.

| Reactivation | Methyl Tetralin, Mol Percent in Product | Relative Activity |
| --- | --- | --- |
| A | 65.5 | 0.90 |
| B | 45 | 0.48 |
| C | 33 | 0.33 |
| D | 40 | 0.41 |
| E | 65.5 | 0.90 |
| F | 65.5 | 0.90 |

It is seen from the results shown that by treating the catalyst in the manner of the invention (cases A, E and F) it is reactivated to a much higher activity than when the reactivation is carried out in the conventional manner.

The catalyst of this example was an activated alumina containing 1.8% nickel and 8.2% molybdenum in the form of their sulfides. It was used in the hydrogenation of the above-described crude alpha-methyl naphthalene. Separate portions of the catalyst in the oxidized state were brought to different temperatures in nitrogen before introducing the hydrogen plus hydrogen sulfide mixture (12:1 mol ratio). In each case the catalyst was treated with the hydrogen-hydrogen sulfide mixture at 200° C. for one hour after which the temperature of the catalyst was raised to 375° C., the pressure was raised to 500 p. s. i. g. in hydrogen, and the catalyst was tested for the hydrogenation under the above described hydrogenation conditions. The relative activities of the catalyst were found to be as shown in the following table:

| Temperature at which $H_2/H_2S$ Introduced | Methyl Tetralin In Product, Mol percent | Relative Activity on LHSV Basis |
| --- | --- | --- |
| 25° C | 63 | 0.82 |
| 150° C | 63 | 0.82 |
| 200° C | 63 | 0.82 |
| 250° C | 58.5 | 0.69 |

It is evident from these results that in order to obtain the enhanced activity it is necessary to cool the oxidized catalyst downward of 250° C.

In this example, the catalyst consisted of an alumina carrier containing 1.8% nickel and 6.6% molybdenum in the form of their sulfides. Separate portions of the catalyst in the oxidized state were brought to a temperature of 250° C. at which point mixtures of hydrogen and/or hydrogen sulfide were introduced, following which the catalyst was treated for one hour at 200° C. with the gas in question. In the this case, however, pure hydrogen sulfide and pure hydrogen as well as mixtures of the two were used. The activities of the catalysts upon subsequent testing were as shown in the following table.

| $H_2/H_2S$ Ratio | Methyl Tetralin in Product, Mol percent | Relative Activity, LHSV Basis |
|---|---|---|
| 12/0 | 23.5 | 0.24 |
| 12/1 | 60 | 0.69 |
| 1/1 | 57 | 0.64 |
| 1/12 | 52 | 0.55 |
| 0/12 | 40 | 0.42 |

It is evident from these results that neither hydrogen nor hydrogen sulfide alone affords the enhanced activity and also that a mol excess of hydrogen over hydrogen sulfide gives the best results. The preferred ratios are from about 2:1 up to 50:1. As long as this ratio is in the specified range the presence of hydrocarbon vapors in the mixture does no harm. Under the conditions of this part of the reactivation treatment hydrocarbon vapors act substantially as inert diluents. The treatments with the mixture of hydrogen and hydrogen sulfide in the above examples were carried out at substantially atmospheric pressure and such pressure is preferred from practical considerations. However, pressure appears to have no appreciable effect and higher or lower pressures may be used if desired.

The catalyst used in this example consisted essentially of an activated alumina carrier containing 3.5% cobalt and 6.4% molybdenum in the form of their sulfides. In two separate cases this catalyst in the oxidized form was brought to 200° C. and treated at that temperature for one hour with hydrogen, hydrogen sulfide, and a 12:1 mixture of hydrogen and hydrogen sulfide, respectively. In each case the catalyst was then heated up to 375° C. and tested in the hydrogenation of alpha-methyl naphthalene as specified above. The relative activities were found to be 0.15, 0.23, and 0.37, respectively. If these gases are introduced when the oxidized catalyst is at a temperature which is not downward of 250° C., the enhanced activity is not obtained.

In this example the catalyst used consisted essentially of an alumina carrier containing 1.8% nickel and 10.7% tungsten in the form of their sulfides. Separate portions of the catalyst in the oxidized state were treated with the hydrogen-hydrogen sulfide mixture and with hydrogen sulfide and hydrogen separately as described in the example immediately above. The resulting activities of the catalyst upon subsequent tests were 0.60 in the case of the 12:1 mixture of hydrogen and hydrogen sulfide, only 0.50 in the case of hydrogen sulfide alone, and only 0.34 in the case of hydrogen alone.

In this example, the catalyst consisted essentially of an alumina carrier containing 9.7% tungsten, 3.2% nickel and 5.1% molybdenum in the form of their sulfides. In separate cases this catalyst in the oxidized state was brought to temperatures of 300° C. and 200° C., respectively at which point they were treated for one hour at these temperatures with a 12:1 mixture of hydrogen and hydrogen sulfide. In each case the catalyst was then heated to 375° C. and tested under the above-described conditions. The relative activities were 0.83 and 0.98, respectively. It is seen from these results that even with this exceptionally active catalyst an enhanced activity is obtained when the catalyst is brought to a temperature downward of 250° C. before contacting it with the mixture of hydrogen and hydrogen sulfide.

This application is a continuation-in-part of my copending application Serial No. 490,683, filed February 25, 1955, now U. S. Patent No. 2,758,957.

I claim as my invention:

1. In the reactivation of a catalyst having as an active promoter a combination of a sulfide of a metal of the iron group and a sulfide of a metal of the lefthand column of group VI which catalyst has been reduced in activity among other things by carbonaceous matter which has deposited on the catalyst through processing a carbonaceous feed at an elevated processing temperature upward of 300° C., said reactivation involving the removal of such carbonaceous matter and sulfur by controlled oxidation at a temperature in the range of about 400 to about 650° C. whereby the said metals are converted to the oxides, the improvement which comprises cooling the catalyst from said oxidation temperature to a temperature downward of about 250° C. in a non-reducing atmosphere and then treating the cooled catalyst at a temperature between about 100° C. and 250° C. for a time upward of about ½ hour with a mixture of hydrogen and hydrogen sulfide in a mol ratio between about 2:1 and about 50:1 prior to raising the temperature of the catalyst up to the said processing temperature preparatory to starting a new process period.

2. In the reactivation of a catalyst having as an active promoter a combination of a sulfide of a metal of the iron group and a sulfide of a metal of the lefthand column of group VI which catalyst has been reduced in activity and contains carbonaceous matter deposited on the catalyst through processing a carbonaceous feed at an elevated processing temperature upward of 300° C., said reactivation involving the removal of such carbonaceous matter and sulfur by controlled oxidation at a temperature in the range of about 400 to about 650° C. whereby the said metals are converted to the oxides, the improvement which comprises cooling the catalyst from said oxidation temperature to a temperature downward of about 250° C. by passing therethrough a cool non-reducing gas, then treating the cooled catalyst at a temperature between about 100° C. and 250° C. for a time upward of about ½ hour with a mixture of hydrogen and hydrogen sulfide in a mol ratio of between about 2:1 and 50:1, and then heating the catalyst up to the said processing temperature in the presence of hydrogen preparatory to starting a new process period.

3. The method according to claim 1 in which said iron group metal is nickel.

4. The method according to claim 1 wherein the metal of group VI is molybdenum.

5. The method according to claim 1 wherein the catalyst contains as active promoter a mixture of sulfides of nickel and molybdenum.

6. The method according to claim 1 wherein the metal of group VI is tungsten.

7. The method according to claim 1 wherein the catalyst contains as active promoter a combination of sulfides of nickel and tungsten.

8. The method according to claim 1 wherein the catalyst contains as active promoter a combination of sulfides of nickel, molybdenum and tungsten.

No references cited.